(12) United States Patent
Bestgen et al.

(10) Patent No.: US 7,831,569 B2
(45) Date of Patent: Nov. 9, 2010

(54) PRESERVING A QUERY PLAN CACHE

(75) Inventors: Robert Joseph Bestgen, Rochester, MN (US); Shantan Kethireddy, Rolling Meadows, IL (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 11/870,118

(22) Filed: Oct. 10, 2007

(65) Prior Publication Data

US 2009/0100114 A1 Apr. 16, 2009

(51) Int. Cl.
*G06F 7/00* (2006.01)

(52) U.S. Cl. .................. 707/676; 707/601; 707/610; 707/616; 707/618; 707/624; 707/634; 707/637; 707/641; 707/649; 707/650; 707/670; 707/678; 707/686

(58) Field of Classification Search .............. 707/601, 707/610, 616, 618, 624, 634, 637, 641, 649, 707/650, 670, 676, 678, 686
See application file for complete search history.

(56) References Cited

U.S. PATENT DOCUMENTS

| | | | |
|---|---|---|---|
| 6,269,431 B1 * | 7/2001 | Dunham | 711/162 |
| 6,353,833 B1 | 3/2002 | Bird et al. | |
| 6,466,931 B1 * | 10/2002 | Attaluri et al. | 1/1 |
| 6,957,435 B2 | 10/2005 | Armstrong et al. | |
| 7,051,174 B2 * | 5/2006 | Ash et al. | 711/162 |
| 7,133,861 B2 | 11/2006 | Day et al. | |
| 2003/0065644 A1 | 4/2003 | Horman et al. | |
| 2004/0087300 A1 | 5/2004 | Lewis | |
| 2004/0243799 A1 | 12/2004 | Hacigumus et al. | |
| 2005/0028134 A1 | 2/2005 | Zane et al. | |
| 2005/0097078 A1 | 5/2005 | Lohman et al. | |
| 2005/0131878 A1 | 6/2005 | Chen et al. | |
| 2005/0131879 A1 | 6/2005 | Ghosh et al. | |
| 2005/0149505 A1 | 7/2005 | Bossman et al. | |
| 2005/0234900 A1 | 10/2005 | Bossman et al. | |
| 2005/0267877 A1 | 12/2005 | Chaudhuri et al. | |
| 2006/0195416 A1 | 8/2006 | Ewen et al. | |

(Continued)

OTHER PUBLICATIONS

Bonnet, Philippe et al., "Partial Answers for Unavailable Data Sources" (12 pages), 1998.

(Continued)

*Primary Examiner*—Etienne P LeRoux
*Assistant Examiner*—Bruce A Witzenburg
(74) *Attorney, Agent, or Firm*—Wood, Herron & Evans, LLP

(57) ABSTRACT

A method, apparatus, and program product are provided for preserving a query plan cache on a backup system having a dataspace containing a copy of data and a copy of a query plan cache from a production system. An update is initiated of at least a portion of the copy of the data on the backup system with a portion of the data on the production system. A merge is initiated of updated query plans in the query plan cache from the production system with corresponding query plans in the copy of the query plan cache on the backup system. Objects are correlated in the updated query plans in the copy of the query plan cache with the updated copy of the data on the backup system.

22 Claims, 3 Drawing Sheets

U.S. PATENT DOCUMENTS

2006/0230016 A1   10/2006  Cunningham et al.
2007/0078825 A1*   4/2007  Bornhoevd et al. ............ 707/3
2008/0133458 A1    6/2008  Zabback et al.

OTHER PUBLICATIONS

Raman, Vijayshankar et al., "Progressive Optimization in Action," 2004 (4 pages).

U.S. Patent and Trademark Office, Office Action issued in related U.S. Appl. No. 11/735,095, dated Aug. 21, 2009.

U.S. Patent and Trademark Office, Final Office Action issued in related U.S. Appl. No. 11/735,095, dated Mar. 31, 2010.

U.S. Patent and Trademark Office, Office Action issued in related U.S. Appl. No. 11/735,133, dated Apr. 30, 2009.

U.S. Patent and Trademark Office, Office Action issued in related U.S. Appl. No. 11/735,133, dated Nov. 25, 2009.

U.S. Patent and Trademark Office, Final Office Action issued in related U.S. Appl. No. 11/735,133, dated Jun. 9, 2010.

* cited by examiner

PRESERVING A QUERY PLAN CACHE

CROSS REFERENCE TO RELATED APPLICATIONS

This invention is related to U.S. patent application Ser. No. 11/735,133, filed on Apr. 13, 2007, by Robert Joseph Bestgen et al., and entitled "Database Query Optimization utilizing Remote Statistics Collection." (ROC920060448US1), which is herein incorporated by reference in its entirety.

FIELD OF THE INVENTION

The present invention generally relates to computers and data processing, and more particularly, to optimizing database queries.

BACKGROUND OF THE INVENTION

One of the most difficult aspects of database query optimization is the balancing act necessary to find the best strategy to run the query without taking too long to find it. A query optimizer is a component of a database management system that attempts to determine the most efficient way to execute a query. The output of an optimizer is typically referred to as a query plan or access plan, which is a form of executable code that can be processed by a database engine to execute the query.

An optimizer often uses a repository, herein denoted as a plan cache, to store the query plans generated for optimized queries. By storing query plans for certain queries, often the stored query plans may be used to execute later queries that are similar or identical to the queries for which the query plans were originally generated, thus eliminating the need to generate new plans for those later queries.

The objects in a plan cache persist until a reboot or restart occurs, or in case of a system failure, until the failover switch to a backup system occurs. It has also been found that optimizer plan caches also store large amounts of valuable optimization data that can be used by new queries to improve performance and avoid "warm-up" effects. "Warm-up" effects are related to additional processing time that is incurred by optimization, statistics collection, building of temporary objects, and so on. Because plan caches contain much of the statistic and optimization information for individual queries, much of this "warm-up" effect can be avoided by using a plan, statistics, or a temporary object from the plan cache.

Many installations often have multiple servers for production, development, high availability, etc. Moreover, these systems often maintain up to date versions of production data, e.g., for disaster recovery solutions on a high availability system. However, query optimization data, such as data generated during the optimization of a query, is often not backed up on a backup system, nor is any of the query optimization data typically generated during optimization of a query ever generated on a backup system. Backup systems typically do not run many of the queries that are run on a production system, and as such, no query optimization data is typically ever generated on backup systems. As a result, to the extent that plan caches may be backed up on backup systems, the plan caches on backup systems are usually not current and would likely cause new queries executed on the backup system to encounter the "warm-up" effect.

What is needed therefore is an automated method to preserve and update optimization data in the query plan caches on backup systems.

SUMMARY OF THE INVENTION

Embodiments of the invention provide a method, apparatus and program product for preserving a query plan cache on a backup system having a dataspace, which contains a copy of data and a copy of a query plan cache from a production system. When an update is initiated of at least a portion of the copy of the data on the backup system with a portion of the data on the production system, a merge of updated query plans in the query plan cache from the production system is initiated with corresponding query plans in the copy of the query plan cache on the backup system. Objects in the updated query plans in the copy of the query plan cache are correlated with the updated copy of the data on the backup system.

In some embodiments, the updated query plans are merged by marking, on the production system, query plans in the query plan cache that have changed since the last update, and then shipping the updated query plans from the query plan cache on the production system to the copy of the query plan cache on the backup system to update the copy of the query plan cache. Objects may be correlated, in an embodiment, in the updated query plans with the updated copy of the data based on name.

Some embodiments may perform statistics collection on the backup system for the updated plans in the copy of the query plan cache. In a specific embodiment, statistics collection is performed by performing deep statistics collections and creating run time objects referenced in the updated copy of the query plan cache on the backup system. Other embodiments may utilize a query time limit governor or a storage limit governor to limit statistics collections and index creations.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the present invention provide a method, apparatus, and program product for preserving a query plan cache containing query plans and other related database objects on a backup system. The query plan cache is a repository containing query plans generated for optimized queries as well temporary database objects and database statistics. The backup system has a dataspace containing a copy of data and a copy of a query plan cache from a production system. Updating the data on the backup system from the production system, in some embodiments, triggers an initiation of a merge of updated query plans in the query plan cache on the production system with corresponding query plans in the copy of the query plan cache on the backup system. Objects in the updated query plans in the copy of the query plan cache are correlated with the updated copy of the data on the backup system. By preserving the plan cache, the plans and objects held in the plan cache are likewise preserved. It will be appreciated that a "query plan cache" consistent with the invention may be implemented using any repository or other data storage suitable for storing one or more query plans. It will also be appreciated that a query plan cache on a production system need not be configured in the same manner as a query plan cache on a backup system, and moreover, that multiple repositories may be maintained on a production or backup system to store query plans.

Figure 1:
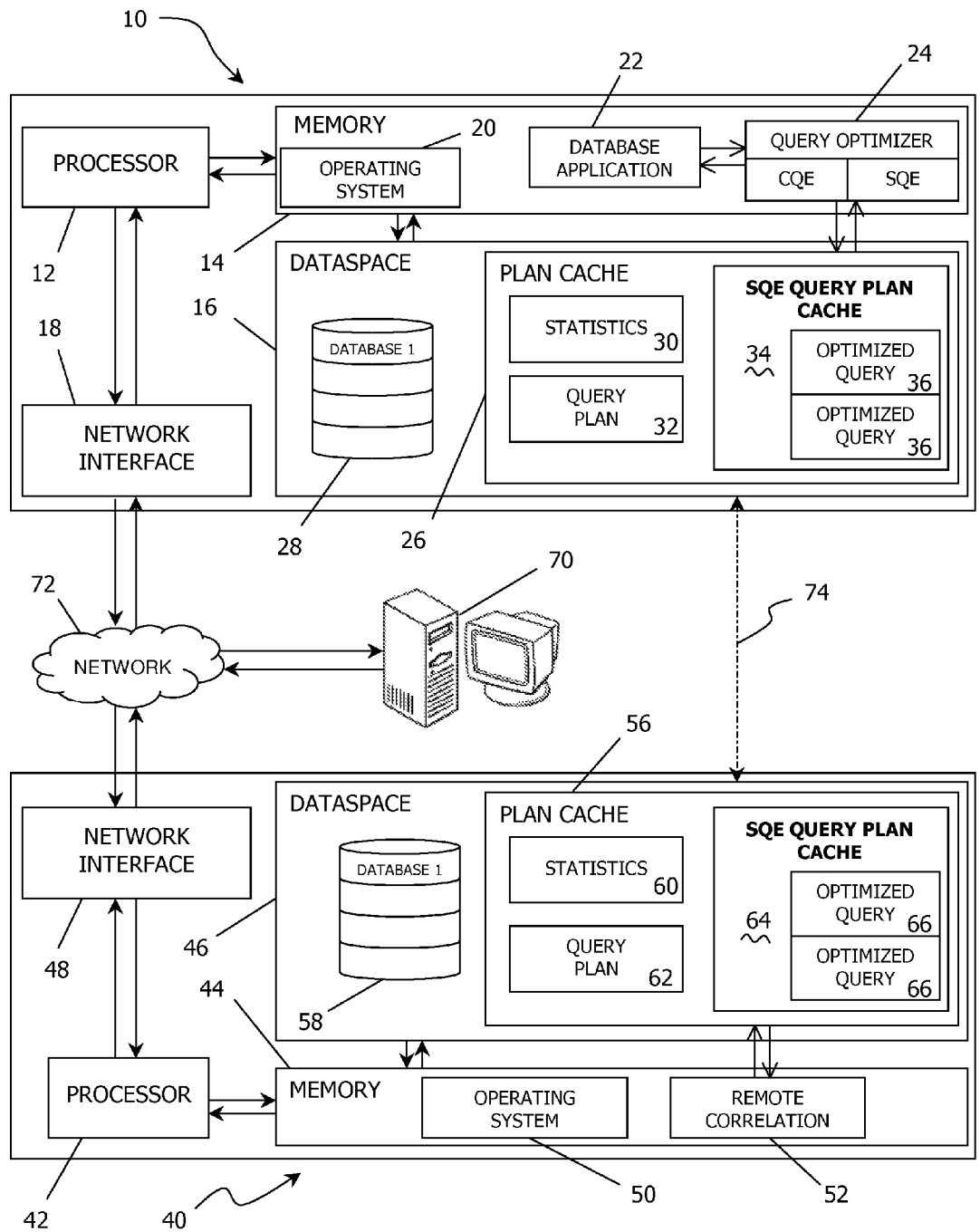
FIG. 1 is a block diagram of an exemplary hardware and software environment for a computer system suitable for implementing database query optimization consistent with embodiment of the invention.

Turning to the drawings, wherein like numbers denote like parts throughout the several views, FIG. 1 illustrates an embodiment of the invention using a high availability solution for disaster recovery. Data recovery is an important factor in any disaster recovery plan. One of the main challenges in disaster recovery is getting a copy of the latest data on the target system. Traditionally, this has been the domain of a high availability provider. For reasons of data security and integrity not related to this invention, computer 10 may be used in a production environment as a local, production system and may communicate with a second, backup system 40, which may have the purpose of maintaining an identical copy of at least a portion of the dataspace found on the production system 10. These high availability solutions often incorporate backup systems, such as system 40, that contain current copies of all dataspaces. But not all of the data from the production systems is backed up on the backup system 40. For example, temporary caches, such as a query optimizer plan cache, may not be maintained on the backup system causing a "warm-up" effect to be felt by new database queries in the case of a failure of the production system 10 and a failover to the backup system 40. This warm-up effect persists until the plan cache on the backup system 40, now the new production system, is recreated.

Each of computers 10, 40 in the embodiment in FIG. 1 may include at least one processor 12, 42 coupled to a memory 14, 44. Processor 12, 42 may represent one or more processors (e.g. microprocessors), and memory 14, 44 may represent the random access memory (RAM) devices comprising the main storage of computers 10, 40, as well as any supplemental levels of memory, e.g., cache memories, non-volatile or backup memories (e.g. programmable or flash memories), read-only memories, etc. In addition, memory 14, 44 may be considered to include memory storage physically located elsewhere in computers 10, 40, e.g., any cache memory in a processor 12, 42, as well as any storage capacity used as a virtual memory, e.g., as stored on a mass storage device 16, 46.

Each computer 10, 40 also typically receives a number of inputs and outputs for communicating information externally. For interface with a user or operator, computers 10, 40 may include one or more user input devices (e.g., a keyboard, a mouse, a trackball, a joystick, a touchpad, a keypad, a stylus, and/or a microphone, among others). Each computer 10, 40 may also include a display (e.g., a CRT monitor, an LCD display panel, and/or a speaker, among others). The interface to computers 10, 40 may also be through an external terminal connected directly or remotely to computers 10, 40, or through another computer 70 communicating with computers 10, 40 via a network interface 18, 48, modem, or other type of communications device.

Each computer 10, 40 operates under the control of operating system 20, 50 and executes or otherwise relies upon various computer software applications, components, programs, objects, modules, data structures, etc. (e.g. database application 22, query optimizer 24, or correlation application 52). Moreover, various applications, components, programs, objects, modules, etc. may also execute on one or more processors in another computer coupled to computer 10, 40 via a network 72, e.g., in a distributed or client-server computing environment, whereby the processing required to implement the functions of a computer program may be allocated to multiple computers over a network 72.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable-type media such as volatile and non-volatile memory devices, floppy and other removable disks, hard disk drives, optical disks (e.g., CD-ROM's, DVD's, etc.), among others, and transmission-type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

In some embodiments, backup system 40 may be any remote computer with resources available to perform correlation between the updated query plans in the plan cache 56 and the updated data in the database 58 tables. In other embodiments, the production system 10 and the backup system 40 may be separate logical partitions on the same computer hardware platform as disclosed in U.S. Pat. No. 6,957,435, which is herein incorporated by reference in its entirety. In alternate embodiments, and more commonly for disaster recovery purposes of a high availability system, production system 10 and backup system 40 may be independent computer hardware platforms communicating through a high-speed connection 74 or a network 72, as depicted in FIG. 1.

Due to the nature of the work performed by the backup system 40, there is typically little interaction between the system 40 and a user or operator. The interface to backup system 40 may typically be through another computer 10, 70 communicating with backup system 40 via a high-speed connection 74, a network 72 or other type of communications device. Other than maintaining the current copy of the production dataspace 46, the processor 42 on backup system 40 may have idle time that could be utilized by other applications, such as the correlation application 52 used to correlate updated objects in the plan cache 56 with the update data in the database 58 tables. Additionally the processor 42 and other resources may be used in conjunction with the correlation application 52 to generate database statistics or create run-time objects on the backup system 40.

The dataspace 16 on the local, production system 10 and the backup dataspace 46 on the backup system 40 may contain objects such as a local and backup plan cache 26, 56 and databases 28, 58 containing tables. The dataspace plan cache 26, 56 may also contain objects such as runtime statistics 30, 60, optimized query plans 32, 62, and a plan cache 34, 64 further containing optimized queries 36, 66. These objects, as discussed above, are used and reused during the execution of query plans and for costing by the query optimizer 24. To avoid warm-up effects incurred while rebuilding or updating the plan cache 64 on the backup system 40, the plan cache 64 should be updated any time that the data on the backup system 40 is updated.

Figure 2:
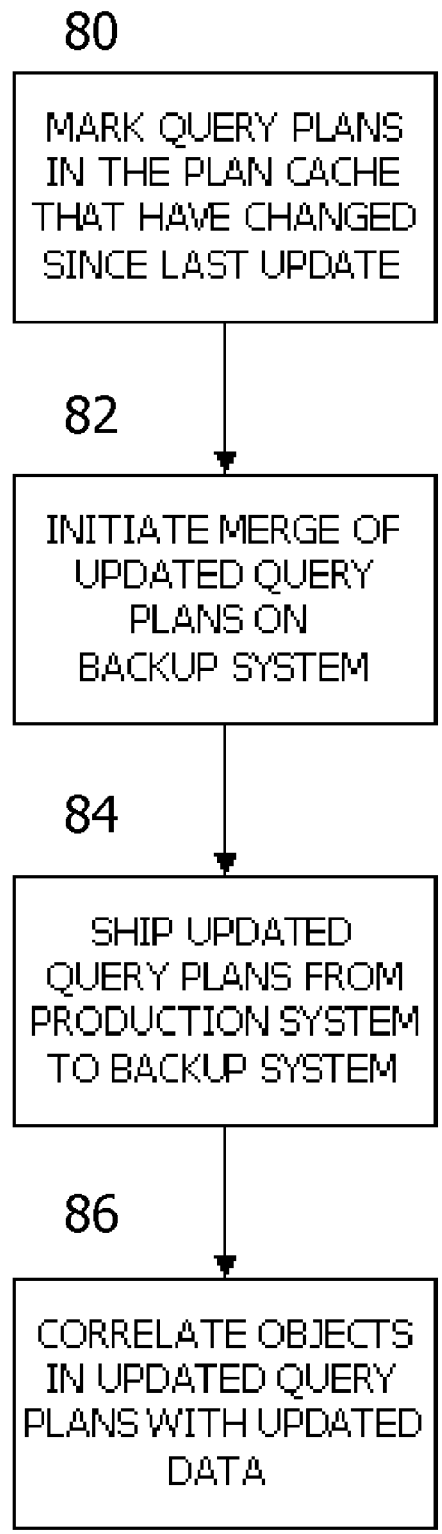
FIG. 2 is a flowchart of an exemplary process for preserving a query plan cache on a backup system consistent with embodiments of the invention.

A method for updating the query plan on the backup system can be seen in the flowchart in FIG. 2. As query plans are updated on the production system, they are marked to indicate that the plan has changed since the last update of the backup system in block 80. Generally, when an update of the data on the backup system is initiated, a merge of the updated query plans on the production system is also initiated with the backup system in block 82, though the merge may be initiated at other times as well. The updated query plans are shipped from the production system to the plan cache on the backup system in block 84. Merging of the data on the backup system may include overwriting current copies of objects such as databases with updated copies from the production system. Plan caches may also be copied from the production system to the backup system, overwriting the existing copies on the backup system. Merging and updating some objects, such as database statistics and run-time objects, may require additional processing on the backup system in addition to copying the objects.

After the query plans have been updated in the plan cache on the backup system, the objects in the plans need to be correlated with updated data in the dataspace on the backup system in block 86. Correlation of the objects, in some embodiments, may be performed based on object name. In these embodiments, long names and short names of the objects may be used to correlate the updated query plans with the updated data, e.g. the library name would be compared to the table long name. Additionally, table sizes may be checked to see if their sizes are similar to the original table for which the query plan was generated. If not, new statistics collection or new run-time objects may be necessary. In other embodiments, correlation may also include checks to make sure that library names, table names and column names match, as well as checking the compatibility of column attributes. Optionally, an alias table may be used where a table may have a different name between the production and backup systems.

Figure 3:
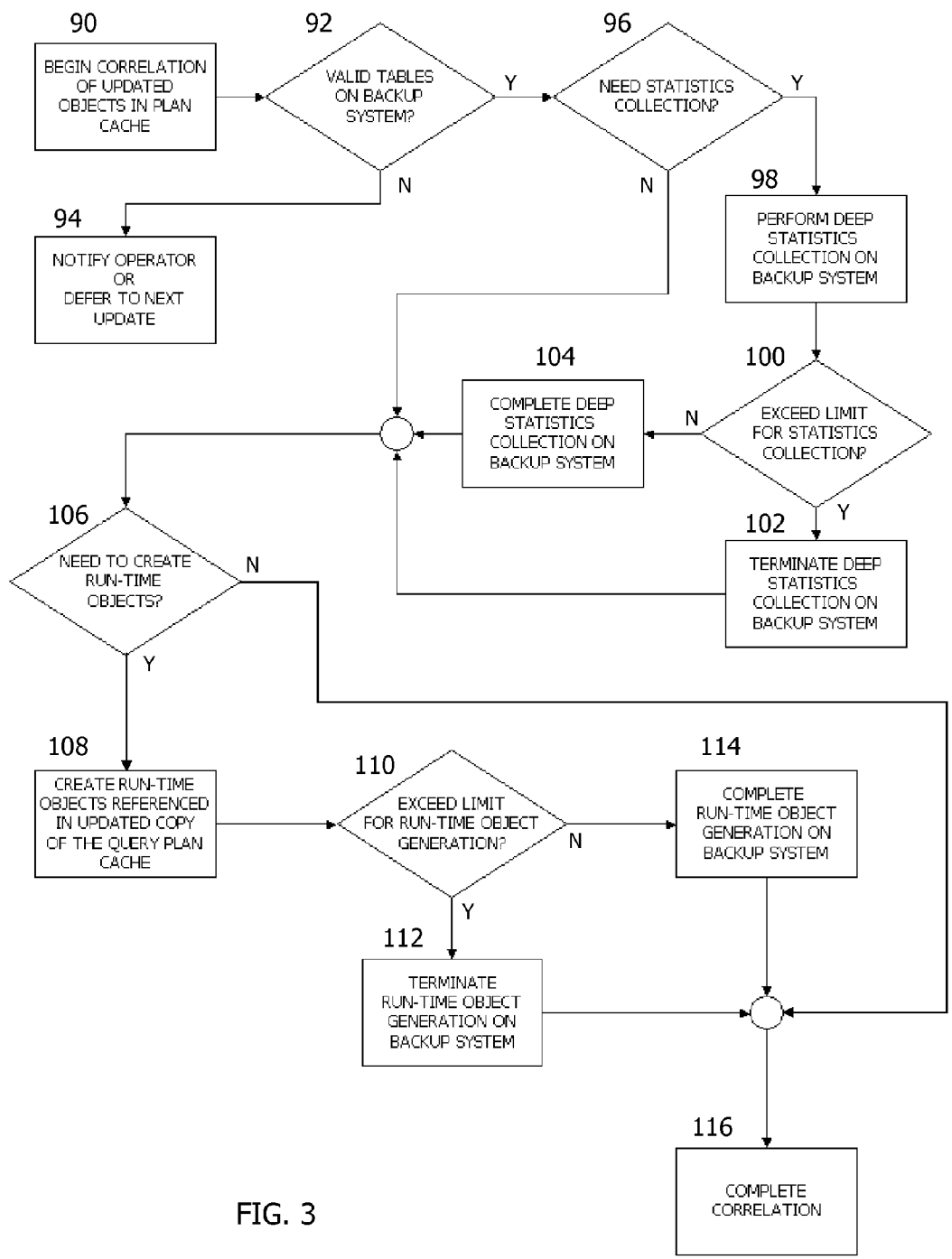
FIG. 3 is a flowchart providing additional detail to the flowchart in FIG. 2.

As discussed above and with reference to FIG. 3, the correlation may additionally require the backup system to perform deep statistics collection for the query plan. The correlation of objects in the plan cache begins in block 90. Validity checking is performed in block 92 on the tables to ensure the number of fields is the same and the types of each of the fields is also the same. If the validity check fails ("NO" branch of decision block 92), then the dataspaces cannot be correlated in block 94. If this occurs, a message may be issued to an administrator or an operator notifying them of the mismatch. The administrator can then choose to manually mirror the changes then or at a later time. Alternatively, the plan may continue to be marked as updated and then wait for the next update to check if the dataspace on the backup system has been altered. If the validity check passes ("YES" branch of decision block 92), the a check for statistics collection is made in decision block 96. If the correlation requires statistics collection ("YES" branch of decision block 96), then statistics collection is initiated on the backup system in block 98. Some statistics collection may require extensive amounts of time and resources. To avoid never ending collections and inhibit the extensive resource usage, some embodiments may employ a query time limit governor or a storage limit governor, which stops the statistics collection when certain thresholds are exceeded. A check of the time limit, storage limit or combination of both is performed in decision block 100, and if the statistics collection has exceeded its time or storage limit ("YES" branch of decision block 100), then the statistics collection is terminated early in block 102. If the time or storage limit is not exceeded ("NO" branch of decision block 100), then the statistics collection is allowed to complete on the backup system in block 104.

Moreover, the correlation may also need to recreate run-time objects that are referenced in the updated copy of the query plan cache. Once the statistics collection has completed in block 104, or if no statistics collection is necessary ("NO" branch of decision block 96), a check is made to determine if run-time objects are needed in block 106. These run-time objects may include objects such as hash tables, sorts, and maintained temporary indexes. If the correlation requires run-time objects ("YES" branch of decision block 106), then creation of run-time objects is initiated on the backup system in block 108. Similar limiting governors may also be employed to the recreation of the run-time objects as with the statistics collection above. A check of the time limit, storage limit or combination of both is performed in decision block 110, and if the creation of run-time objects has exceeded its time or storage limit ("YES" branch of decision block 110), then the run-time object generation is terminated early in block 112. If the time or storage limit is not exceeded ("NO" branch of decision block 110), then the creation of run-time objects is allowed to complete on the backup system in block 114. The correlation of objects then completes in block 116.

By preserving and updating the plan cache on the backup system, extra processing time due to warm up effects will be avoided in the case of a failover situation to the backup server. The plan cache could also be reloaded onto the production system from the backup system after a reboot or restart of the production system, to again avoid delays and additional processing of queries due the warm-up effects.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method for preserving a query plan cache, the method comprising, in a backup system having a dataspace containing a copy of data and a copy of a query plan cache from a production system:

initiating an update of at least a portion of the copy of the data on the backup system with a portion of the data on the production system;

initiating a merge of updated query plans in the query plan cache from the production system with corresponding query plans in the copy of the query plan cache on the backup system;

correlating objects in the updated query plans in the copy of the query plan cache with the updated copy of the data on the backup system; and performing statistics collection on the backup system for the updated plans in the copy of the query plan cache.

2. The method of claim 1 wherein merging updated query plans comprises:

marking, on the production system, query plans in the query plan cache that have changed since the last update; and shipping updated query plans from the query plan cache on the production system to the copy of the query plan cache on the backup system to update the copy of the query plan cache.

3. The method of claim 1 wherein correlating objects comprises:

correlating objects in the updated query plans with the updated copy of the data based on name.

4. The method of claim 3 wherein the name is a long name.

5. The method of claim 3 wherein the name is a short name.

6. The method of claim 1 wherein performing statistics collection comprises:

performing deep statistics collections; and creating run time objects referenced in the updated copy of the query plan cache.

7. The method of claim 6 wherein run time objects are selected from the group consisting of hash tables, sorts, maintained temporary indexes, and combinations thereof.

8. The method of claim 7 further comprising:

utilizing a query time limit governor to limit statistics collections and index creations.

9. The method of claim 6 further comprising:

utilizing a storage limit governor to limit statistics collections and index creations.

10. An apparatus comprising:

a processor; and program code configured to be executed by the processor to preserve a query plan cache on a backup system having a dataspace containing a copy of data and a copy of a query plan cache from a production system, the program code resident on the computer readable medium and configured to initiate an update of at least a portion of the copy of the data on the backup system with a portion of the data on the production system, initiate a merge of updated query plans in the query plan cache from the production system with corresponding query plans in the copy of the query plan cache on the backup system;

correlate objects in the updated query plans in the copy of the query plan cache with the updated copy of the data on the backup system;

perform statistics collection on the backup system for the updated plans in the copy of the query plan cache.

11. The apparatus of claim 10 wherein the program code is configured to merge updated query plans by marking, on the production system, query plans in the query plan cache that have changed since the last update, and shipping updated query plans from the query plan cache on the production system to the copy of the query plan cache on the backup system to update the copy of the query plan cache.

12. The apparatus of claim 10 wherein the program code is configured to correlate objects by correlating objects in the updated query plans with the updated copy of the data based on name.

13. The apparatus of claim 12 wherein the name is a long name.

14. The apparatus of claim 12 wherein the name is a short name.

15. The apparatus of claim 10 wherein the program product is configured to perform statistics collection by performing deep statistics collections, and creating run time objects referenced in the updated copy of the query plan cache.

16. The apparatus of claim 15 wherein run time objects are selected from the group consisting of hash tables, sorts, maintained temporary indexes, and combinations thereof.

17. The apparatus of claim 15 wherein the program product is further configured to utilize a query time limit governor to limit statistics collections and index creations.

18. The apparatus of claim 15 wherein the program product is further configured to utilize a storage limit governor to limit statistics collections and index creations.

19. A program product, comprising:

a computer readable medium; and a program code configured to preserve a query plan cache on a backup system having a dataspace containing a copy of data and a copy of a query plan cache from a production system, the program code resident on the computer readable medium and configured to initiate an update of at least a portion of the copy of the data on the backup system with a portion of the data on the production system, initiate a merge of updated query plans in the query plan cache from the production system with corresponding query plans in the copy of the query plan cache on the backup system, correlate objects in the updated query plans in the copy of the query plan cache with the updated copy of the data on the backup system; and perform statistics collection on the backup system for the updated plans in the copy of the query plan cache.

20. The program product of claim 19 wherein the program code is configured to initiate a merge of updated query plans by marking, on the production system, query plans in the query plan cache that have changed since the last update, and shipping updated query plans from the query plan cache on the production system to the copy of the query plan cache on the backup system to update the copy of the query plan cache.

21. The program product of claim 19 wherein the program code is configured to correlate objects by correlating objects in the updated query plans with the updated copy of the data based on name.

22. The program product of claim 19 wherein the program code is configured to perform statistics collection by performing deep statistics collections, and creating run time objects referenced in the updated copy of the query plan cache.

* * * * *